(12) United States Patent
Khaleghi et al.

(10) Patent No.: US 6,618,430 B1
(45) Date of Patent: *Sep. 9, 2003

(54) METHODS AND APPARATUS FOR RECEIVING N-CHIP RESISTANT CODES

(75) Inventors: Farideh Khaleghi, Ottawa (CA); Norman P. Secord, Ottawa (CA); Leo Strawczynski, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/211,096

(22) Filed: Dec. 14, 1998

(51) Int. Cl.[7] ............................. H04B 1/69; H04B 1/707
(52) U.S. Cl. ..................... 375/147; 375/142; 375/150
(58) Field of Search ........................... 375/140, 142, 375/147, 148, 149, 150, 346, 348

(56) References Cited

U.S. PATENT DOCUMENTS

| | | | | |
|---|---|---|---|---|
| 5,457,713 A | * | 10/1995 | Sanderford, Jr. et al. | ... 375/145 |
| 5,737,327 A | * | 4/1998 | Ling et al. | ... 370/335 |
| 5,815,798 A | * | 9/1998 | Bhagalia et al. | ... 455/13.4 |
| 6,173,007 B1 | * | 1/2001 | Odenwalder et al. | ... 375/146 |
| 6,269,088 B1 | * | 7/2001 | Masui et al. | ... 370/335 |
| 6,317,422 B1 | * | 11/2001 | Khaleghi et al. | ... 370/342 |
| 6,381,229 B1 | * | 4/2002 | Narvinger et al. | ... 370/328 |

* cited by examiner

*Primary Examiner*—Stephen Chin
*Assistant Examiner*—David B. Lugo

(74) *Attorney, Agent, or Firm*—Gibbons, Del Deo, Dolan, Griffinger & Vecchione

(57) ABSTRACT

The invention relates to systems and methods for receiving signals modulated with a carrier frequency, wherein the signals include spreading chip sequences having at least one zero. The invention includes a method of receiving and despreading spread spectrum signals wherein the spread spectrum signals include spreading chip sequences having at least one zero and at least one non-zero chip. The method includes receiving and sampling a spread spectrum communication signal. The receiver generates a despreading code which is synchronized with the sampled spread spectrum communication signal. The sampled spread spectrum communication signal is then despread with the despreading code by omitting at least one operation involving at least one zero chip. The invention further includes a receiver configured to receive signals modulated with a carrier frequency over a channel, wherein the signals include spreading chip sequences having at least one zero. The receiver includes an antenna capable of receiving a spread spectrum communication signal. It also includes a despreading code generator connected to the antenna. The receiver includes a demodulator connected to the antenna and configured to separate the carrier frequency from the spread spectrum communication signal. It also includes a searcher connected to the demodulator and configured to synchronize a despreading code generated by the despreading code generator with the spread spectrum communication signal. The receiver also includes a Rake receiver connected to the demodulator, configured to despread the separated spread spectrum communication signal and to omit at least one operation involving at least one zero chip.

35 Claims, 16 Drawing Sheets

| Chip # | 1 | 2 | 3 | 4 | 5 | 6 | 7 | ... |
|---|---|---|---|---|---|---|---|---|
| Signal | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |

FIG. 1A

| Chip # | 1 | 2 | 3 | 4 | 5 | 6 | 7 | ... |
|---|---|---|---|---|---|---|---|---|
| User 1 | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |
| User 2 | $W_{2,1}P_1$ | $W_{2,2}P_2$ | $W_{2,3}P_3$ | $W_{2,4}P_4$ | $W_{2,5}P_5$ | $W_{2,6}P_6$ | $W_{2,7}P_7$ | ... |

FIG. 1B

| Chip # | 1 | 2 | 3 | 4 | 5 | 6 | 7 | ... |
|---|---|---|---|---|---|---|---|---|
| Path 1 | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |
| Path 2 | Delay | $W_{1,1}P_1$ | $W_{1,2}P_2$ | $W_{1,3}P_3$ | $W_{1,4}P_4$ | $W_{1,5}P_5$ | $W_{1,6}P_6$ | ... |

FIG. 2A

| Chip # | 1 | 2 | 3 | 4 | 5 | 6 | 7 | ... |
|---|---|---|---|---|---|---|---|---|
| User 1 | $W_{1,1}P_1$ | $W_{1,2}P_2$ | $W_{1,3}P_3$ | $W_{1,4}P_4$ | $W_{1,5}P_5$ | $W_{1,6}P_6$ | $W_{1,7}P_7$ | ... |
| User 2 | Delay | $W_{2,1}P_1$ | $W_{2,2}P_2$ | $W_{2,3}P_3$ | $W_{2,4}P_4$ | $W_{2,5}P_5$ | $W_{2,6}P_6$ | ... |

FIG. 2B

| Chip # | 1 | 2 | 3 | 4 | 5 | 6 | 7 | ... |
|---|---|---|---|---|---|---|---|---|
| Signal | $W_{1,1}P_1$ | 0 | $W_{1,2}P_3$ | 0 | $W_{1,3}P_5$ | 0 | $W_{1,4}P_7$ | ... |

| Chip # | 1 | 2 | 3 | 4 | 5 | 6 | 7 | ... |
|---|---|---|---|---|---|---|---|---|
| Signal | $W_{1,1}P_1$ | 0 | 0 | $W_{1,2}P_4$ | 0 | 0 | $W_{1,3}P_7$ | ... |

$\bullet\bullet\bullet$

FIG. 3A

| Chip # | 1 | 2 | 3 | 4 | 5 | 6 | 7 | ... |
|---|---|---|---|---|---|---|---|---|
| Signal | 0 | $W_{1,1}P_2$ | 0 | $W_{1,2}P_4$ | 0 | $W_{1,3}P_6$ | 0 | ... |

| Chip # | 1 | 2 | 3 | 4 | 5 | 6 | 7 | ... |
|---|---|---|---|---|---|---|---|---|
| Signal | 0 | 0 | $W_{1,1}P_3$ | 0 | 0 | $W_{1,2}P_6$ | 0 | ... |

| Chip # | 1 | 2 | 3 | 4 | 5 | 6 | 7 | ... |
|---|---|---|---|---|---|---|---|---|
| Path 1 | $W_{1,1}P_1$ | 0 | $W_{1,2}P_3$ | 0 | $W_{1,3}P_5$ | 0 | $W_{1,4}P_7$ | ... |
| Path 2 | Delay | $W_{1,1}P_1$ | 0 | $W_{1,2}P_3$ | 0 | $W_{1,3}P_5$ | 0 | ... |

FIG. 4A

| Chip # | 1 | 2 | 3 | 4 | 5 | 6 | 7 | ... |
|---|---|---|---|---|---|---|---|---|
| User 1 | $W_{1,1}P_1$ | 0 | $W_{1,2}P_3$ | 0 | $W_{1,3}P_5$ | 0 | $W_{1,4}P_7$ | ... |
| User 2 | Delay | $W_{2,1}P_1$ | 0 | $W_{2,2}P_3$ | 0 | $W_{2,3}P_5$ | 0 | ... |

FIG. 4B

| Chip # | 1 | 2 | 3 | 4 | 5 | 6 | 7 | ... |
|---|---|---|---|---|---|---|---|---|
| Signal | $W_{1,1}P_1$ | $W_{1,2}P_2$ | 0 | $W_{1,3}P_4$ | $W_{1,4}P_5$ | 0 | $W_{1,5}P_7$ | ... |

| Chip # | 1 | 2 | 3 | 4 | 5 | 6 | 7 | ... |
|---|---|---|---|---|---|---|---|---|
| Signal | $W_{1,1}P_1$ | $W_{1,2}P_2$ | 0 | 0 | $W_{1,3}P_5$ | $W_{1,4}P_6$ | 0 | ... |

| Chip # | 1 | 2 | 3 | 4 | 5 | 6 | 7 | ... |
|---|---|---|---|---|---|---|---|---|
| Signal | $W_{1,1}P_1$ | $W_{1,2}P_2$ | $W_{1,3}P_3$ | 0 | $W_{1,4}P_5$ | $W_{1,5}P_6$ | $W_{1,6}P_7$ | ... |

| Chip # | 1 | 2 | 3 | 4 | 5 | 6 | 7 | ... |
|---|---|---|---|---|---|---|---|---|
| User 1 | $W_{1,1}P_1$ | $W_{1,2}P_2$ | $W_{1,3}P_3$ | 0 | 0 | $W_{1,4}P_6$ | $W_{1,5}P_7$ | ... |

| Chip # | 1 | 2 | 3 | 4 | 5 | 6 | 7 | ... |
|---|---|---|---|---|---|---|---|---|
| Signal | $W_{1,1}P_1$ | $W_{1,2}P_2$ | $W_{1,3}P_3$ | 0 | 0 | 0 | $W_{1,4}P_7$ | ... |

| Chip # | 1 | 2 | 3 | 4 | 5 | 6 | 7 | ... |
|---|---|---|---|---|---|---|---|---|
| User 1 | 0 | $W_{1,1}P_2$ | $W_{1,2}P_3$ | 0 | $W_{1,3}P_5$ | $W_{1,4}P_6$ | 0 | ... |

| Chip # | 1 | 2 | 3 | 4 | 5 | 6 | 7 | ... |
|---|---|---|---|---|---|---|---|---|
| User 1 | 0 | 0 | $W_{1,1}P_3$ | $W_{1,2}P_4$ | 0 | 0 | $W_{1,3}P_7$ | ... |

| Chip # | 1 | 2 | 3 | 4 | 5 | 6 | 7 | ... |
|---|---|---|---|---|---|---|---|---|
| User 1 | 0 | 0 | 0 | $W_{1,1}P_4$ | $W_{1,2}P_5$ | 0 | 0 | ... |

| Chip # | 1 | 2 | 3 | 4 | 5 | 6 | 7 | ... |
|---|---|---|---|---|---|---|---|---|
| User 1 | 0 | $W_{1,1}P_2$ | $W_{1,2}P_3$ | $W_{1,3}P_4$ | 0 | $W_{1,4}P_6$ | $W_{1,5}P_7$ | ... |

| Chip # | 1 | 2 | 3 | 4 | 5 | 6 | 7 | ... |
|---|---|---|---|---|---|---|---|---|
| User 1 | 0 | $W_{1,1}P_2$ | $W_{1,2}P_3$ | $W_{1,3}P_4$ | $W_{1,4}P_5$ | 0 | $W_{1,5}P_7$ | ... |

| Chip # | 1 | 2 | 3 | 4 | 5 | 6 | 7 | ... |
|---|---|---|---|---|---|---|---|---|
| User 1 | 0 | $W_{1,1}P_2$ | $W_{1,2}P_3$ | $W_{1,3}P_4$ | $W_{1,4}P_5$ | $W_{1,5}P_6$ | 0 | ... |

METHODS AND APPARATUS FOR RECEIVING N-CHIP RESISTANT CODES

FIELD OF THE INVENTION

This invention relates generally to the field of spread spectrum communication in Code Division Multiple Access (CDMA) wireless communication systems and more particularly to apparatus and methods for receiving time misalignment resistant spread spectrum signals.

BACKGROUND OF THE INVENTION

Direct sequence modulation of a carrier signal is a known technique for generating wide-band, low power density signals which have statistical properties similar to random noise. In a common method of direct-sequence spread spectrum modulation, a pseudo-random chip sequence (also called a pseudo-noise code sequence or a PN code sequence) is used to encode data which is then placed on a carrier waveform. The chip rate of the pseudo-random sequence is usually much higher than the data rate. The resulting encoded signal is generally spread across a bandwidth exceeding the bandwidth necessary to transmit the data, hence the term "spread spectrum."

At the receiving end, the receiver recovers the desired signal by correlating the received spread spectrum signal with the PN sequence (spreading sequence) corresponding to the desired signal when it is able to match this sequence to a sufficient degree. To do so, the receiver generates the same PN chip sequence locally, synchronizes its chip sequence to the received chip sequence, and tracks the signal by maintaining synchronization during reception of data.

For severely multipath dispersive environments, the downlink capacity of CDMA systems, such as IS-95, is reduced by intra-cell interference. Downlink signals in a cell are orthogonal or substantially orthogonal at the transmitter (hereinafter the term orthogonal or substantially orthogonal includes the terms orthogonal and/or substantially orthogonal), but tend to suffer a loss of orthogonality due to multipath propagation, time jitter (imprecise implementation leading to errors), etc.

The uplink capacity of CDMA systems, such as IS-95, is reduced because the uplink signals are not orthogonal when they are transmitted. However, orthogonal signals may be used for the uplink if different user symbols are received with timing alignment. For nondispersive channels, time alignment of the signals results in orthogonality and rejection of the intra-cell interference. In reality, however., wireless channels are dispersive and propagation along multiple paths causes time misalignment in which case multipath components will interfere with other multipath components having different delays. In this case it may only be possible to align a single component from each signal. Therefore, orthogonality is partially lost due to the interference between non-aligned terms.

Systems are currently being developed for transmitting signals which are resistant to time misalignment caused by multipath delays. While current receivers should be able to receive these signals, they will do so inefficiently.

Accordingly there exists a need for a system and method of efficiently receiving a code which is resistant to time misalignment (delay) caused by multipath.

There also exists a need for a system and method of receiving a code which is resistant to interference caused by time jitter of the system.

A need also exists for a system and method of receiving a code which is resistant to interference caused by time misalignment of the signals received from different users.

Accordingly it is an object of the present invention to provide systems and methods of receiving codes in CDMA systems which are resistant to effects of time misalignment caused by multipath propagation delays.

It is another object of the present invention to provide systems and methods of receiving codes which are resistant to interference caused by time jitter of the system.

It is another object of the present invention to provide systems and methods of receiving codes which are resistant to effects of time misalignment of signals from different users.

These and other objects of the invention will become apparent to those skilled in the art from the following description thereof.

SUMMARY OF THE INVENTION

In accordance with the teachings of the present invention, these and other objects may be accomplished by the present invention, which receives and processes signals modulated with a carrier frequency, wherein the signals include spreading chip sequences having at least one zero and at least one non-zero.

An embodiment of the invention includes a method of receiving and despreading spread spectrum signals wherein the spread spectrum signals include spreading chip sequences having at least one zero and at least one non-zero chip. The embodiment includes receiving a spread spectrum communication signal, sampling the spread spectrum communication signal, generating a despreading code, synchronizing the despreading code with the sampled spread spectrum communication signal, and despreading the sampled spread spectrum communication signal with the synchronized despreading code. The despreading is performed on a subset of the chips by omitting arithmetic operations involving at least one zero chip.

Another embodiment of the invention includes a method of receiving signals modulated with a carrier frequency, wherein the signals include spreading chip sequences having at least one zero chip. This embodiment includes receiving a modulated spread spectrum communication signal at an antenna separating the carrier frequency and converting the signal to baseband. The baseband signal is then sampled. A despreading code is generated and synchronized with the baseband signal. The baseband signal is correlated with the despreading code such that arithmetic operations involving at least one zero chip are omitted during the correlation process.

Still another embodiment of the invention includes a receiver for receiving spread spectrum communication signals modulated with a carrier frequency, wherein the signals include spreading chip sequences having at least one zero. The receiver includes receiver means for receiving a modulated spread spectrum communication signal, code generator means coupled to the receiver means for generating a despreading code within the receiver. It includes RF processing means for separating the carrier frequency from the modulated spread spectrum communication signal. It includes synchronizer means for synchronizing the separated spread spectrum communication signal with the despreading code and, despreading means for despreading the spread spectrum communication signal with the despreading code. The despreading is performed on a subset of the chips by omitting arithmetic operations involving at least one zero chip.

In yet another embodiment, the invention includes a receiver configured to receive signals modulated with a carrier frequency, wherein the signals include spreading chip sequences having at least one zero. The receiver includes an antenna capable of receiving a spread spectrum communication signal, a despreading code generator connected to the antenna, and a demodulator connected to the antenna and configured to separate the carrier frequency from the spread spectrum communication signal. It includes a searcher connected to the demodulator and configured to synchronize the spread spectrum communication signal with a despreading code generated by the despreading code generator. The searcher omits arithmetic operations involving at least one zero chip. It also includes a Rake receiver connected to the demodulator, configured to despread the separated spread spectrum communication signal by omitting arithmetic operations involving at least one zero chip.

The invention will next be described in connection with certain exemplary embodiments; however, it should be clear to those skilled in the art that various modifications, additions and subtractions can be made without departing from the spirit or scope of the claims.

BRIEF DESCRIPTION OF THE DRAWINGS

The invention will be more clearly understood by reference to the following detailed description of an exemplary embodiment in conjunction with the accompanying drawings, in which:

FIG. 1A depicts a spread spectrum signal received by a conventional CDMA receiver;

FIG. 1B depicts two spread spectrum codes received by a conventional CDMA receiver;

FIG. 2A depicts the code of FIG. 1A showing a time delay inserted by the communication channel due to multipath;

FIG. 2B depicts the codes of FIG. 1B showing a time delay inserted by the system into the second user's signal;

FIG. 3A depicts time delay resistant codes in accordance with the invention illustrated for one received signal;

FIG. 4A depicts possible time delay resistant codes, received by the invention from one signal experiencing multipath;

FIG. 4B depicts possible time delay resistant codes, received by the invention from two users;

FIG. 6 depicts more time delay resistant codes received by the invention;

FIG. 8 depicts still more time delay resistant codes received by the invention;

DETAILED DESCRIPTION OF THE INVENTION

Figure 3B:
FIG. 3B depicts more time delay resistant codes in accordance with the invention illustrated for one received signal.

Inventions described herein may be made or used in conjunction with inventions described, in whole or in part, in copending U.S. patent application Ser. No. 09/060,604, filed Apr. 15, 1998, entitled "Methods and Apparatus of N-Chip Resistant Spreading in CDMA Systems," which is hereby incorporated by reference as if fully set forth herein.

In CDMA systems, each cell or sector generally employs the same PN code for all of the users in that cell or sector. In the following discussion only cells will be referenced, however, those skilled in the art will recognize the applicability to sectors also. In orthogonal CDMA systems, each cell also employs a limited number of orthogonal codes or quasi-orthogonal codes such as Walsh, Gold or some other substantially orthogonal code which it distributes to the different users. (Reference herein to orthogonal, quasi-orthogonal or substantially orthogonal codes should be understood to include any or all of these codes). The PN code is generally combined with the orthogonal code to form a spreading code which suppresses inter-cell interference.

Communications by different users may experience different time delays due to time jitter (imprecise implementation of time alignment algorithms), propagation delay and/or multipath dispersion, which will cause interference. Multipath signals originating from one source may cause similar interference. Employing spreading sequences which have a zero cross-correlation or small cross-correlation when they are aligned and zero or small cross-correlation values when they are off by one or more chips enables the system to compensate for such delays. A preferred example of this would be a conventional orthogonal spreading code including a Walsh code with zeros inserted after each chip therein (not shown). The possible placement of the zero(s) will be discussed further herein.

FIG. 1A illustrates a transmitted signal in a CDMA system employing conventional spreading codes. Assuming (i) that the combined transmitter and receiver filter is an ideal Nyquist filter; (ii) perfect clock and carrier recovery; and (iii) the samples are taken at ideal sampling points, FIG. 1A also illustrates the signals at the receiver before despreading. Each orthogonal code W is made up of chips represented by $W_{x,y}$ where x represents the user and y represents the chip number. Each PN code P is also made up of chips $P_z$ wherein z represents the chip number. There is no need for a double subscript for P since all the users within a cell use the same PN code. In the example illustrated in FIG. 1A, the channel is nondispersive and the equipment employed does not experience any jitter. Thus, since the PN code chips received during each time period are identical and the $W_{x,y}$ chips do not suffer from the effects of multipath there is no interference. FIG. 1A only illustrates one user so the interference is irrelevant.

FIG. 2A illustrates a more realistic model showing the results of a dispersive channel. FIG. 2A shows the same transmitted signal illustrated in FIG. 1A, but in FIG. 2A, two signals are received; the original signal and the same signal delayed by one chip due to multipath dispersion. It will be apparent to one skilled in the art that this relative delay could be greater or less than the delay shown. Because of this delay, the PN code chips at a particular time are no longer identical and therefore the $W_{x,y}$ $P_z$ chips are no longer orthogonal. As such, the two signals will interfere with each other.

FIGS. 3A–10 show different possible delay resistant spreading codes which may be employed with the present invention. In the first code depicted in FIG. 3A, every even numbered PN code chip is replaced with a zero. When the altered PN code is combined with the orthogonal code W, the orthogonal code chips $W_{x,y}$ are only combined with the non-zero PN code chips. When comparing sequences of an equal number of chips, the length of the orthogonal code $W_{x,y}$ used in FIG. 3A is necessarily less than that used in FIG. 1A. If the signal does not experience a delay (i.e. does not suffer from multipath or interference from another signal), the PN code chips match up during each time period, the $W_{x,y}$ chips remain orthogonal and the two signals cross correlate to zero (i.e do not interfere). If, using the same spreading code, the user receives a signal from one path which experiences a 1 chip (FIG. 4A) or odd number of chips delay relative to a signal received from a second path, the chips from each signal will still cross correlate to zero since each of the non-zero chips will align with a zero. Thus, there is no interference and this code is resistant to odd numbered chip misalignments caused by delays. As seen from the different codes illustrated in FIGS. 3A–10, the number of added zeros can be increased and the placement of zeros can be varied. It will be apparent to one skilled in the art that the more zeros that are added, the more resistant the code is to delays, however the processing gain of the code is also reduced.

The signals acquired by the receiver would ideally be as shown in FIG. 1B. In reality one or more of the received codes would probably experience delay as shown in FIG. 2B, and would cause interference due to receiving multiple signals from one source via multiple paths. However, if the system employs the first spreading code illustrated in FIG. 3A and the signal from one user transmitted over a first path experiences a 1 chip or odd number of chips delay relative to a signal transmitted over a second path, the chips from each signal will still cross correlate to zero since each of the non-zero chips will align with a zero. Thus, as illustrated in FIG. 4B, the desired signal interpreted by the receiver is resistant to odd numbered chip misalignments caused by delays. Unlike conventional CDMA receivers, this invention can efficiently decode the N-Chip resistant spreading described herein.

Figure 5:
FIG. 5 depicts still more time delay resistant codes received by the invention.
Figure 7:
FIG. 7 depicts alternative time delay resistant codes received by the invention.
Figure 9:
FIG. 9 depicts more time delay resistant codes received by the invention.
Figure 10:
FIG. 10 depicts additional time delay resistant codes received by the invention.

FIG. 5 illustrates that groupings of two consecutive non-zero chips may be separated by as few as one zero chip, to a maximum number of zeros where only the first two and the last two consecutive chips are non-zero. FIG. 6 illustrates that groupings of three consecutive non-zero chips may be separated by as few as one zero chip, to a maximum number of zeros where only the first three and the last three consecutive chips are non-zero. FIG. 7 illustrates that the number of consecutive non-zero chips may be anywhere from 2 as seen from FIG. 5 to a maximum where only one or two zeros are substituted into the code.

Figure 11:
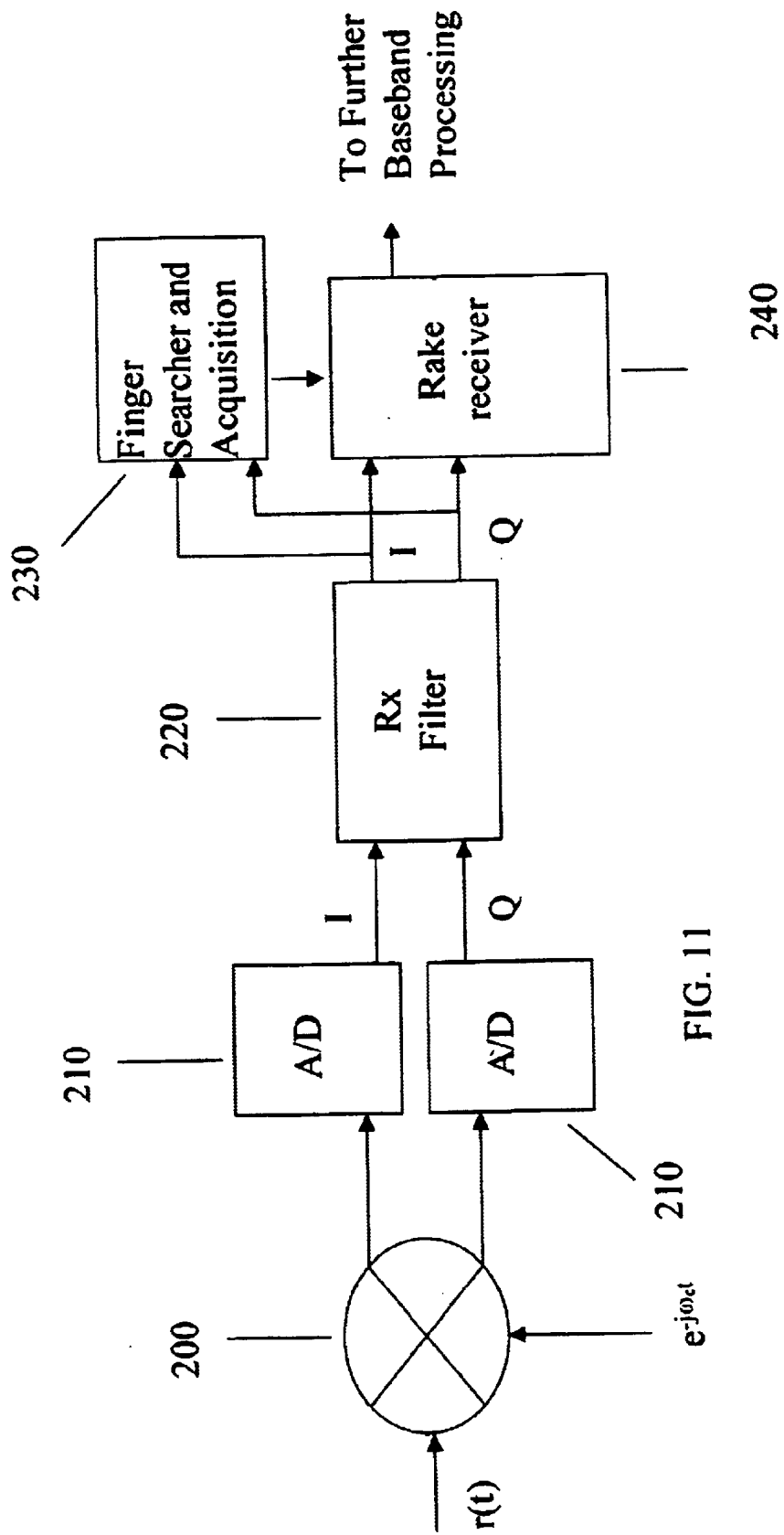
FIG. 11 depicts a Rake receiver.

FIG. 11 illustrates an apparatus in accordance with the present invention for receiving the above noted spreading codes. The apparatus shown is a portion of a spread spectrum receiver and the invention is also applicable to a reverse link receiver or a forward link receiver.

As illustrated in FIG. 11, a received signal r(t) with center frequency $\omega_c = 2\pi f_c$ is converted to a baseband signal. Those skilled in the art will recognize that there are many conventional methods of down conversion to the baseband I and Q signals. Any of these methods may be utilized with the present invention. The received signal is multiplied by $e^{-j\omega t}$ by a complex signal multiplier 200 and the resulting signal is converted to discrete samples by A/D converter 210 and then filtered by the receive filter 220 ($R_x$). The output of the A/D converter contains the samples on both the "I" and "Q" channel. The $R_x$ filter is a complex filter which can thus filter both the I and Q channel samples. The output of the $R_x$ filter is provided to the searcher 230 and the Rake receiver 240. The output of the Rake receiver includes received data samples which may be further processed in accordance with conventional practice.

Figure 12:
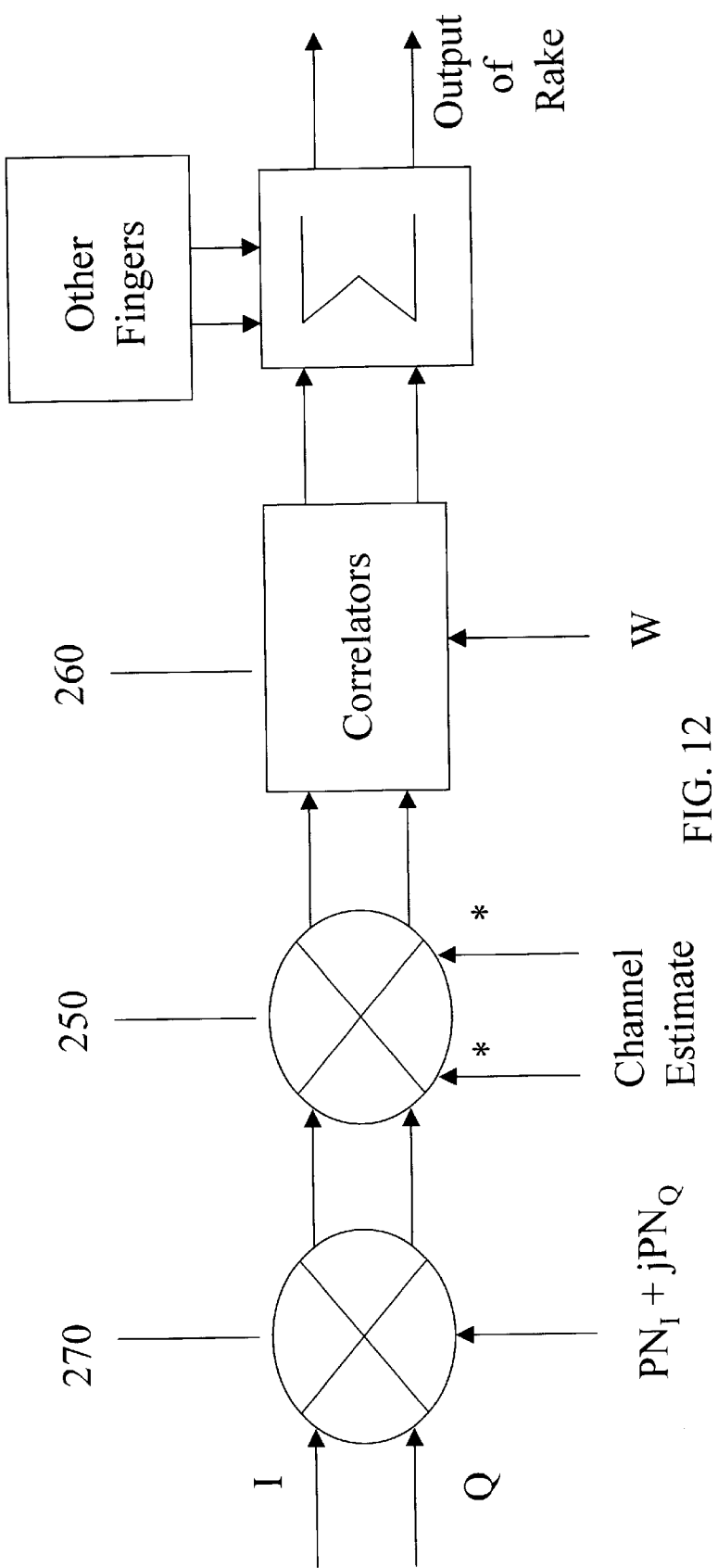
FIG. 12 depicts a finger of the Rake receiver illustrated in FIG. 11.

The Rake receiver 240 can be designed with an arbitrary number of fingers as is known in the art. An example of a finger of the Rake receiver 240 of the present invention is illustrated in FIG. 12. The finger includes a complex signal multiplier 270 where the signal is descrambled by the complex PN sequence ($PN_1 + jPN_Q$). Since the location of the zero chips are already known, and the signals are synchronized, it is possible to perform the descrambling at a rate which is less than the chip rate (i.e. less than a sample per chip). By doing so, this and all subsequent operations in the Rake finger are performed on only those samples that correspond to a non-zero chip. While not optimal, it is possible to perform these operations on some but not all of the zero chips, thus this configuration also falls within the scope of the invention. The output of the multiplier 270 is a signal which is impaired by the characteristics of the communications channel. To compensate for these characteristics, this output is multiplied in the multiplier 250 by the complex conjugate (represented by *) of a channel estimate produced either by the searcher 230 or within the Rake receiver 240. This multiplication may be performed after the correlator 260 instead of before. Those skilled in the art will recognize that while the system described relates to coherent receivers, it is also applicable to non-coherent receivers without channel estimation. The output of the multiplier 250 thus constitutes a desired data signal, after correction of the estimated channel impairments. The unit 260 constitutes a data correlator for the data signal identified by the Walsh code sequence W. Those skilled in the art will recognize that while omitting operations at the complex signal multiplier 270 leads to the most efficient implementation, it is also possible to operate this multiplier at the chip rate and to omit operations corresponding to zero chips at later stages in the Rake finger. Those skilled in the art will also recognize that different fractional rates relative to the chip rate can be realized depending upon the percentage of zeros employed with the spreading code.

In the receiver, a searcher (230 in FIG. 11) recovers synchronization (i.e. timing) and control signals from the spread spectrum data signal. Those timing and control signals are utilized by complex multipliers and correlators in the Rake finger (shown in FIG. 12) to decode and despread one or more of the data signals received. Those skilled in the art will recognize that the input signal to the searcher may be sampled at a rate which is greater than the chip rate to facilitate finger searching and acquisition. Those skilled in the art will also recognize that knowledge of the zeros may be used to modify synchronization and finger searching and acquisition since some or all of the zero chips can be omitted in the correlation processes involved in these operations as well.

Those skilled in the art will also realize that instead of using multipliers (270 and 250), various techniques may be used to separate the codes from the signals, such as modulo-2, subtraction, or summation. One or more of the elements of FIG. 12 could be realized as the same or different microprocessors or as some other device such as an application-specific integrated circuit (ASIC), programmable logic array (PLA), or another suitable logic device.

It will thus be seen that the invention efficiently attains the objects set forth above, among those made apparent from the preceding description. In particular, the invention provides apparatus and methods of receiving spreading codes which are resistant to the effects of time delays encountered in CDMA systems. Those skilled in the art will appreciate that the configurations depicted in FIGS. 1–12 reduce the effects of time lag.

It will be understood that changes may be made in the above construction and in the foregoing sequences of operation without departing from the scope of the invention. It is accordingly intended that all matter contained in the above description or shown in the accompanying drawings be interpreted as illustrative rather than in a limiting sense.

It is also to be understood that the following claims are intended to cover all of the generic and specific features of the invention as described herein, and all statements of the scope of the invention which, as a matter of language, might be said to fall therebetween.

Having described the invention, what is claimed as new and secured by letters patent is:

1. A method of employing a delay resistant spreading code, comprising
    providing a pseudo-random chip sequence;
    altering the pseudo-random chip sequence by replacing at least one chip of a pseudo-random chip sequence with at least one zero chip to provide an altered pseudo-random chip sequence that has a non-zero pseudo-random chip sequence and the at least one zero chip;
    combining the altered pseudo-random chip sequence with an orthogonal code so that orthogonal code chips of the orthogonal code are only combined with non-zero pseudo-random chip sequence code chips of the altered pseudo-random chip sequence to employ a delay resistant spreading code.

2. A method according to claim 1, further comprising and despreading spread spectrum communication signals communicated over a channel, the spread spectrum communication signal having the delay resistant spreading code;
    sampling said spread spectrum communication signal;
    the receiver generating a despreading code;
    synchronizing said despreading code with said sampled spread spectrum communication signal; and,
    despreading said sampled spread spectrum communication signal with said despreading code.

3. A method of receiving signals according to claim 2, wherein:
    said synchronizing includes omitting at least one operation involving at least one zero chip.

4. A method of receiving signals according to claim 3, wherein:
    said omitting at least one operation involving at least one zero chip includes omitting a plurality of operations each involving at least one zero chip.

5. A method of receiving signals according to claim 2, if wherein:
    said despreading includes despreading at least one non-zero chip from said sampled spread spectrum signal and omitting at least one operation involving at least one zero chip.

6. A method of receiving signals according to claim 5, wherein:
    said omitting at least one operation involving at least one zero chip includes omitting a plurality of operations each involving at least one zero chip.

7. A method of receiving signals according to claim 2 further comprising:
    generating a channel estimation despreading code;
    further despreading said sampled spread spectrum communication signal with said channel estimation despreading code; and,
    estimating said channel with said signal despread by said channel estimation despreading code, wherein said further despreading and said estimating includes omitting at least one operation involving at least one zero chip.

8. The method of receiving signals according to claim 7, wherein:
    said omitting at least one operation involving at least one zero chip includes omitting a plurality of operations each involving at least one zero chip.

9. A method according to claim 1, further comprising receiving signals modulated with a carrier frequency and transmitted over a channel, the receiving including receiving at an antenna a signal that is a modulated spread spectrum communication signal, the received signal including the delay resistant spreading code;
    separating a carrier frequency from said received signal;
    converting said received signal to baseband after the separating to yield a baseband signal;
    sampling said baseband signal;
    generating a despreading code;
    synchronizing said despreading code with said baseband signal; and,
    despreading said baseband signal with said despreading code, wherein said despreading includes omitting at least one operation involving the at least one zero chip.

10. A method of receiving signals according to claim 9, wherein:
    said omitting at least one operation involving at least one zero chip includes omitting a plurality of operations each involving at least one zero chip.

11. A method of receiving signals according to claim 9, further comprising:
    generating a channel estimation despreading code;
    further despreading said baseband signal with said channel estimation despreading code; and,
    estimating said channel with said baseband signal further despread by said channel estimation despreading code, wherein said further despreading and said estimating includes further omitting at least one operation involving at least one zero chip.

12. A method of receiving signals according to claim 11, wherein said further omitting at least one operation involving at least one zero chip includes omitting a plurality of operations each involving at least one zero chip.

13. A method of receiving signals according to claim 9, wherein: said synchronizing includes further omitting at least one operation involving at least one zero chip.

14. A method of receiving signals according to claim 13, wherein said further omitting at least one operation involving at least one zero chip includes omitting a plurality of operations each involving at least one zero chip.

15. A receiver for receiving spread spectrum communication signals modulated with a carrier frequency over a channel comprising:
    receiver means for receiving a signal that is a modulated spread spectrum communication signal that includes spreading chip sequences having at least one zero;
    code generator means coupled to said receiver means for generating a plurality of despreading codes within said receiver;
    RF processing means for separating said carrier frequency from said modulated spread spectrum communication signal;
    synchronizer means for synchronizing one of said plurality of despreading codes with said separated spread spectrum communication signal; and, despreading means for despreading said separated spread spectrum communication signal with said one of said plurality of despreading codes, wherein said despreading includes omitting at least one operation involving at least one zero chip, wherein said spreading chip sequences having at least one zero are generated by altering a pseudo-random chip sequence by replacing at least one chip of a pseudo-random chip sequence with at least one zero chip to provide an altered pseudo-random chip sequence that has a non-zero pseudo-random chip sequence and the at least one zero chip, and combining the altered pseudo-random chip sequence with an orthogonal code so that orthogonal code chips of the orthogonal code are only combined with non-zero pseudo-random chip sequence code chips of the altered pseudo-random chip sequence to employ a delay resistant spreading code.

16. A receiver according to claim 15, wherein said synchronizer means omits at least one operation involving at least one zero chip.

17. A receiver according to claim 16, wherein:

said synchronizer means omits a plurality of operations each involving at least one zero chip.

18. A receiver according to claim 15, wherein:

said omitting at least one operation involving at least one zero chip includes omitting a plurality of operations each involving at least one zero chip.

19. A receiver according to claim 15, further comprising:

another despreading means for despreading said spread spectrum communication signal with another of said plurality of codes generated by said code generator means; and channel estimation means for estimating said channel with said signal despread by said another of said plurality of codes, wherein said another despreading means and said channel estimation means omit at least one operation involving at least one zero chip.

20. The receiver according to claim 19, wherein:

said omitting at least one operation involving at least one zero chip includes omitting a plurality of operations each involving at least one zero chip.

21. A receiver configured to receive signals modulated with a carrier frequency over a channel, wherein the signals include spreading chip sequences having at least one zero, comprising:

an antenna capable of receiving a spread spectrum communication signals;

a despreading code generator coupled to said antenna;

a demodulator coupled to said antenna and configured to separate said carrier frequency from said spread spectrum communication signal;

a searcher coupled to said demodulator and configured to synchronize a despreading code generated by said despreading code generator with said spread spectrum communication signal; and, a Rake receiver coupled to said demodulator, configured to despread said separated spread spectrum communication signal and to omit at least one operation involving at least one zero chip, wherein the spreading chip sequences having at least one zero are generated by altering a pseudo-random chip sequence by replacing at least one chip of a pseudo-random chip sequence with at least one zero chip to provide an altered pseudo-random chip sequence that has a non-zero pseudo-random chip sequence and the at least one zero chip, and combining the altered pseudo-random chip sequence with an orthogonal code so that orthogonal code chips of the orthogonal code are only combined with non-zero pseudo-random chip sequence code chips of the altered pseudo-random chip sequence to employ a delay resistant spreading code.

22. A receiver according to claim 21, wherein:

said searcher is configured to synchronize said despreading code by omitting at least one operation involving at least one zero chip.

23. A receiver according to claim 21, wherein:

said Rake receiver is configured to despread said separated spread spectrum communication signal by omitting a plurality of operations each involving at least one zero chip.

24. A receiver according to claim, wherein:

said Rake receiver is further configured to estimate said channel by despreading said separated spread spectrum communication signal and by omitting a plurality of operations each involving at least one zero chip.

25. A receiver according to claim 21, wherein:

said Rake receiver is configured to estimate said channel by despreading said separated spread spectrum communication signal and by omitting at least one operation involving at least one zero chip.

26. A receiver according to claim 21, wherein said antenna includes a plurality of antenna.

27. A receiver according to claim 21, wherein:

said Rake receiver is configured to despread at least one non-zero chip from said separated spread spectrum communication signal and to not despread at least one zero chip from said separated spread spectrum communication signal.

28. A method as in claim 11, wherein the orthogonal code is selected from a group consisting of substantially orthogonal, quasi-orthogonal and orthogonal.

29. A method as in claim 11, further comprising cross-correlating to zero even as misalignments occur that are caused by delays as between signals from different paths, the cross-correlating arising by aligning at least one chip of the non-zero pseudo-random chip sequence associated with one of the signals with a respective chip of the zero pseudo-random chip sequence associated with another of the signals.

30. A receiver according to claim 15, wherein said spreading chip sequences include an altered pseudo-random chip sequence in which at least one chip of a pseudo-random chip sequence is replaced by the at least one zero so as to have a non-zero pseudo-random chip sequence and at least one zero chip, the altered pseudo-random chip sequence being combined with an orthogonal code such that orthogonal code chips of the orthogonal code are only combined with non-zero pseudo-random chip sequence code chips of the altered pseudo-random chip sequence to employ a delay resistant spreading code, the synchronizer means effecting the synchronizing based on the delay resistant spreading code.

31. A receiver as in claim 30, wherein the orthogonal code is selected from a group consisting of substantially orthogonal, quasi-orthogonal and orthogonal.

32. A receiver as in claim 30, wherein the synchronizer means is configured to cross-correlate to zero even as misalignments occur that are caused by a delay in the spread spectrum communication signal so as to align at least one chip of the non-zero pseudo-random chip sequence associated with the spread spectrum communication signal with a respective chip of the zero pseudo-random chip sequence associated with another signal.

33. A receiver according to claim 21, wherein said spreading chip sequences include an altered pseudo-random chip sequence in which at least one chip of a pseudo-random chip sequence is replaced by the at least one zero so as to have a non-zero pseudo-random chip sequence and at least one zero chip, the altered pseudo-random chip sequence being combined with an orthogonal code such that orthogonal code chips of the orthogonal code are only combined with non-zero pseudo-random chip sequence code chips of the altered pseudo-random chip sequence to employ a delay resistant spreading code, the synchronizer means effecting the synchronizing based on the delay resistant spreading code.

34. A receiver as in claim 33, wherein the orthogonal code is selected from a group consisting of substantially orthogonal, quasi-orthogonal and orthogonal.

35. A receiver as in claim 33, wherein the searcher is configured to cross-correlate to zero even as misalignments occur that are caused by a delay in the spread spectrum communication signal so as to align at least one chip of the non-zero pseudo-random chip sequence associated with the spread spectrum communication signal with a respective chip of the zero pseudo-random chip sequence associated with another signal.

* * * * *